United States Patent
Jensen et al.

(10) Patent No.: US 10,183,249 B2
(45) Date of Patent: Jan. 22, 2019

(54) COATED, RETICULATED FOAM AIR FILTER SUITABLE FOR RESPIRATION

(71) Applicant: No Toil Industries, Inc., Yuba City, CA (US)

(72) Inventors: Bradley Allen Jensen, Yuba City, CA (US); Robert Allen Jensen, Yuba City, CA (US); Michael P Salladin, Oak Glen, CA (US)

(*) Notice: Subject to any disclaimer, the term of this patent is extended or adjusted under 35 U.S.C. 154(b) by 0 days.

(21) Appl. No.: 15/064,827

(22) Filed: Mar. 9, 2016

(65) Prior Publication Data

US 2016/0263510 A1 Sep. 15, 2016

Related U.S. Application Data

(60) Provisional application No. 62/130,451, filed on Mar. 9, 2015, provisional application No. 62/244,191, filed on Oct. 21, 2015.

(51) Int. Cl.
*B01D 53/02* (2006.01)
*B01D 46/00* (2006.01)

(52) U.S. Cl.
CPC ...... *B01D 46/0035* (2013.01); *B01D 2275/40* (2013.01)

(58) Field of Classification Search
CPC .. B01D 39/083; B01D 39/1692; B01D 46/00; B01D 46/10; B01D 46/12; B01D 46/36; B01D 46/521; B01D 46/2418
See application file for complete search history.

(56) References Cited

U.S. PATENT DOCUMENTS

| | | | | |
|---|---|---|---|---|
| 5,437,701 | A * | 8/1995 | Townsley | B01D 39/1676 55/486 |
| 5,573,811 | A | 11/1996 | Townsley | |
| 5,951,745 | A * | 9/1999 | Gibbs | B01D 39/083 55/524 |
| 6,032,474 | A * | 3/2000 | Dale | B01L 7/00 62/239 |
| 6,774,183 | B1 * | 8/2004 | Palumbo | C08G 63/00 525/176 |
| 2004/0109853 | A1 * | 6/2004 | McDaniel | A62D 3/02 424/94.6 |
| 2006/0185336 | A1 * | 8/2006 | Nakano | B01J 20/165 55/524 |
| 2011/0045218 | A1 * | 2/2011 | Harper | B01D 53/72 428/34.2 |

FOREIGN PATENT DOCUMENTS

| | | |
|---|---|---|
| CN | 203412680 | 1/2014 |
| DE | 3915010 | 11/1990 |
| WO | 1995004586 | 2/1995 |

* cited by examiner

*Primary Examiner* — Christopher P Jones

(57) ABSTRACT

A coated, reticulated foam air filter for filtering air suitable for respiration is described. The air filter comprises a reticulated foam structure and a nontoxic tackified coating applied to a functional surface of the foam structure.

13 Claims, 6 Drawing Sheets

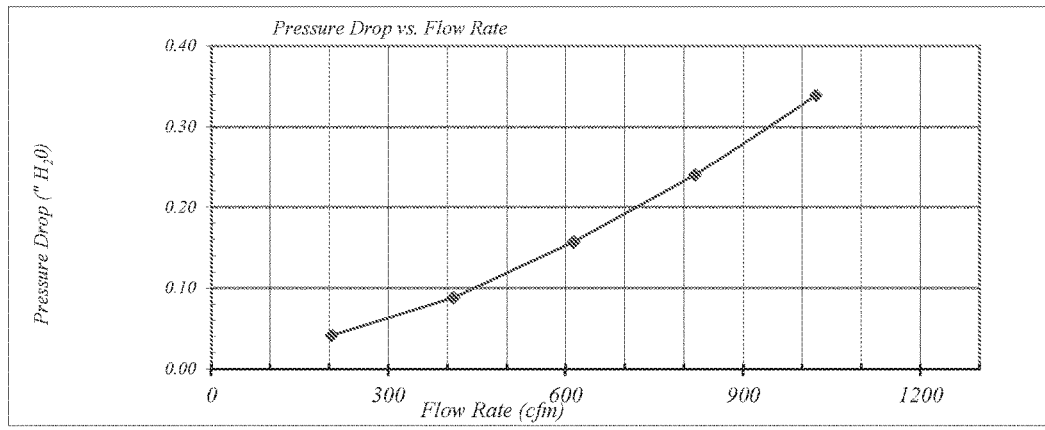
Figure 2
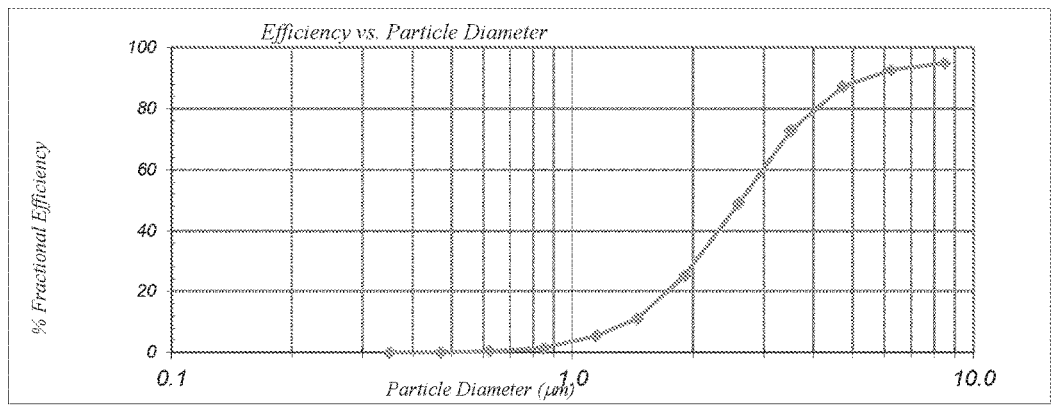
Figure 3
| Flow Rate (cfm) | DP "H₂O | Size Range (μm) | Initial Fractional Efficiency(%) |
|---|---|---|---|
| 205 | 0.041 | 0.3-0.4 | 0.0 |
| 410 | 0.088 | 0.4-0.55 | 0.0 |
| 614 | 0.157 | 0.55-0.7 | 0.3 |
| 819 | 0.240 | 0.7-1.0 | 1.4 |
| 1024 | 0.339 | 1.0-1.3 | 5.4 |
|  |  | 1.3-1.6 | 10.9 |
|  |  | 1.6-2.2 | 24.9 |
|  |  | 2.2-3.0 | 48.9 |
|  |  | 3.0-4.0 | 72.7 |
|  |  | 4.0-5.5 | 87.3 |
|  |  | 5.5-7.0 | 92.7 |
|  |  | 7.0-10.0 | 94.9 |
Figure 4

| MERV Rating | Efficiency | Particle Size | Controlled Contaminant | Applications | Filter Type |
|---|---|---|---|---|---|
| 1-4 | <20% | >10 microns | Pollen, Dust mites, Cockroach body parts and droppings, Spanish moss, Sanding Dust, Spray paint dust, Textile Fibers, Carpet Fibers | Residential, Light Commercial, Equipment, Fiberglass, Poly Panel | Throwaway - Fiberglass or synthetic media panel, 1 inch thick, Washable - Aluminum mesh, foam rubber panel, Electrostatic - Self-charging (passive) woven polycarbonate panel |
| 5-8 | <20 to 35% | 3 to 10 μm | Mold, Spores, Dust mite body parts and droppings, Cat and dog dander, Hair spray, Fabric Protector, Dusting Aids, Pudding Mix | Commercial, Industrial, Better Residential, Paint Booth | Pleated filters - Extended surface with cotton or polyester media or both, 1 to 6 inches thick. Cartridge Filters - Viscous cube or pocket filters, Throwaway - Synthetic Media filters |
| 9-12 | 40 to 75% | 1 to 3 μm | Legionella (bacteria associated with A/C towers), Humidifier dust, Lead dust, Milled Flour, Auto emission particles, Nebulizer drops | Superior Residential, Better commercial buildings, Hospital laboratories | Pleated filters - Extended surface with cotton or polyester media or both, 1-6 inches thick. Box Filters - rigid style cartridge 6-12 inches deep |
| 13-16 | 80 to 95% | 0.3 to 1 μm | All bacteria, Droplet nuclei (sneeze), Cooking oil, Most smoke, Insecticide dust, Most face powder, Most paint pigments | General Surgery, Hospitals - Inpatient care, Health Care, Superior Commercial | Bag Filters - Non-supported (flexible) microfine fiberglass or synthetic media, 12 to 35 inches deep. Box Filters - Rigid style cartridge, 6-12 inches deep |

Figure 5

Section A-A

COATED, RETICULATED FOAM AIR FILTER SUITABLE FOR RESPIRATION

CROSS-REFERENCE TO RELATED PATENT APPLICATIONS

This application claims priority from Provisional U.S. Application Ser. No. 62/130,451, filed Mar. 9, 2015, titled "AIR FILTRATION APPARATUS AND KIT," which is incorporated herein by reference in its entirety. This application also claims priority from Provisional U.S. Application 62/244,191, filed Oct. 21, 2015, titled "COATED, RETICULATED FOAM AIR FILTER SUITABLE FOR RESPIRATION," which is incorporated herein by reference in its entirety.

FIELD OF THE INVENTION

The present invention generally relates to air filters, and more particularly to foam air filters with tackified coatings suitable for respiration.

BACKGROUND

Reticulated foams, also known as open-cell foams, are a type of filter material. Reticulated foam filters may be coated with a tackified coating to improve filtering charateristics. It is desired that the tackified coating achieve penetration into the heart of the foam. However, these coatings may result in the coated, reticulated foam filters being unsuitable for human respiration due to the out-gassing of toxic substances.

SUMMARY OF THE INVENTION

This disclosure is directed towards a coated, reticulated foam filter suitable for respiration. The invention may provide for a coated, reticulated foam filter that does not outgas. The invention may provide for a coated, reticulated foam filter that is odorless. The invention may provide for a biodegradable coating. The invention may provide for a washable coating.

This Summary is provided to introduce a selection of concepts in a simplified form that are further described in the Detailed Description and Drawings. This Summary is not intended to identify essential features of the claimed subject matter or to limit the scope of the claimed subject matter.

It is noted that in this disclosure and particularly in the claims, terms such as "comprises", "comprised", "comprising" and the like can have the meaning attributed to it in U.S. Patent law; e.g., they can mean "includes", "included", "including", and the like; and the terms such as "consisting essentially of" and "consists essentially of" have the meaning ascribed to them in U.S. Patent law, e.g., they allow for elements not explicitly recited but exclude elements that are found in the prior art or that affect a basic or novel characteristic of the invention. These and other embodiments are disclosed or are obvious from and encompassed by, the following Detailed Description.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2 is a graph illustrating flow rate vs. pressure drop.

FIG. 3 is a graph illustrating particle diameter vs. fractional efficiency

FIG. 4 is a table summarizing the results of the ANSI/ASHRAE Standard 52.2-2007 test.

FIG. 5 is a table published by the EPA, adapted from the ANSI/ASHRAE Standard 52.2-2007 tables, summarizing the meaning of the different Minimum Efficiency Reporting Value (MERV) ratings.

DETAILED DESCRIPTION OF THE INVENTION

Instant invention solves both the toxicity problem and the application problem by applying an emulsion of a non-toxic coating and an acidic aqueous carrier fluid to a reticulated foam filter.

The following are definitions of terms as used in the various embodiments of present invention.

The term "biodegradable" as used herein refers to all the products of the filter oil being able to be decomposed by microorganisms. In the case of the tackified coating, treatment with water and sodium carbonate or like substance may be, but not required, to remove and render the coating biodegradable.

The term "filter" as used herein refers to a mechanism used to remove airborne particulate matter and encompasses the concept of pre-filters.

The term "filter oil" as used herein refers to the stable mixture of the tackified coating and the solvent or carrier fluid.

The term "non-toxic" as used herein refers to items which, when used as part of an air filter, result in filtered air that is safe for respiration.

The term "odorless" as used herein refers to items which do not functionally emit or give off odors or fumes.

The term "reticulated foam" as used herein refers to all types of open-cell foams or their functional equivalents for air filtration purposes.

The term "tackified coating" as used herein refers to the portion of the emulsion that remains on the foam after the carrier solution evaporates and that allows the coated foam to filter by an impingement mechanism of action.

The present invention begins with the selection of a suitable tackified coating. Along with the characteristics required for creating a suitable tackified coating for a reticulated foam filter, the present invention is non-toxic. In some embodiments, present invention may be odorless, washable, biodegradable, and/or not outgas.

Figure 1:
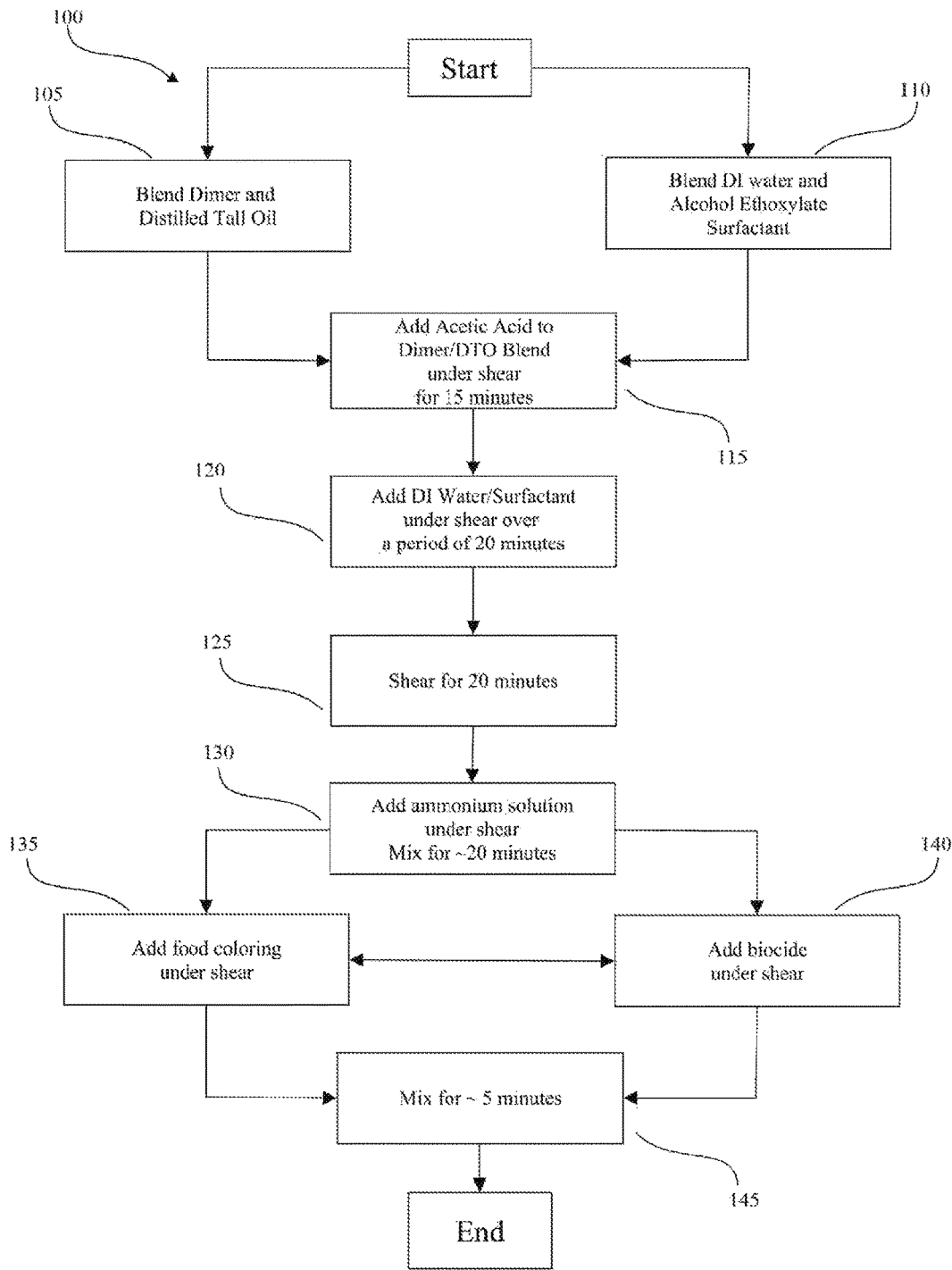
FIG. 1 is a flow diagram of a process for producing a filter oil composition in accordance with the teachings of this disclosure.

Referring now to FIG. 1, a process 100 for the manufacture of the tackified coating and water emulsion is disclosed. In step 105, the tackified coating is composed of a dimer acid, C-36 dicarboxylic acid, and a distilled tall oil (DTO). In the production of the dimer acid, it is cooked at high temperatures until there are no contaminants left. By definition, the distilled tall oil has already been purified and contains no toxic contaminants. The C-36 dicarboxylic acid and the DTO are blended, resulting in a dimer/DTO blend. This blend is the main component of the tackified coating and is itself non-toxic and odorless.

The next step is to temporarily lower the viscosity of the tackified coating so that it may be applied throughout the reticulated foam's structure. This lowering of viscosity must be done without the use of toxic solvents or carrier solutions which would result in toxic offgassing. Instant invention addresses the issue of toxic solvents and carrier solutions by creating an emulsion of the tackified coating and water. While the writing of it is easy, the actual creation of the emulsion is quite difficult because of difficulties inherent in the process.

While the viscosity must be lowered by emulsifying the tackified coating in water, the proportions of tackified coating to carrier solution cannot be too low, otherwise when the emulsion is applied to the foam, it will flow right off, never getting the opportunity to adhere properly. This limitation represents a problem.

Emulsions generally have a continuous phase in greater proportion than a given dispersed phase. Because of the range of permissible viscosities for application, the general case for emulsions is not possible. To achieve the correct viscosity to apply the emulsion to the reticulated foam, instant embodiment must create an emulsion where the continuous phase, the water, is actually smaller in proportion to the dispersed phase, the tackified coating. According to Formulation 1, the dispersed phase, the tackified coating, is 69.9% by weight of the filter oil, whereas the continuous phase comprises only 30.1% by weight of the filter oil.

The exemplary embodiment resolves the delineated issues starting with the preparation of the carrier solution. In Step 110, deionized water (DI water) and alcohol ethoxylate surfactant (non-ionic surfactant) are blended and heated to 120° F. In step 115, acetic acid is then blended under shear into the dimer/DTO blend and allowed to shear for 15 minutes. In step 120, the DI water/surfactant blend is introduced into the vortex formed in the dimer/DTO blend over the course of 20 minutes. Once the entire DI water/surfactant blend has been introduced, the mixture is allowed to shear for approximately 20 minutes, step 125. Ammonium hydroxide solution is added under shear and allowed to mix for 10 minutes in step 130.

It is vital to note that throughout the entire process, the pH of the mixture remains acidic. It is well known in the chemical arts that when creating an emulsion of oil and water, shifting the acid/base balance over to a basic pH facilitates the formation of an emulsion. This approach comes at a cost, though, because a basic pH would also trigger a spontaneous saponification reaction.

Because tackified coatings are designed with a defined set of characteristics in mind, forcing a coating to undergo a chemical reaction which could change those properties would be counterproductive. In the case of exemplary embodiment, if the dimer/DTO coating were exposed to a basic pH change, the coating would be changed at the chemical level and rendered useless. The same would be true of any tackified coating containing triglycerides.

It should be noted that an ammonium hydroxide solution is added. It is added in such small quantities so as to never change the pH of the blend from acid to base. It should be noted that in the exemplary formulation for a stable emulsion, the pH throughout the process remains acidic, and the final pH is acidic, approximately pH 5.5.

A preferred color (step 135) and/or biocide (step 140) may be introduced under shear and allowed to mix for 5 minutes (step 145). The exemplary formulation of the filter oil is now complete.

Formulation 1:

| | |
|---|---|
| C-36 Dicarboxylic Acid (Dimer) | 54.75% |
| 30% Rosin Acid Distilled Tall Oil (DTO) | 15.15% |
| 5% Acetic Acid Solution | 0.5% |
| Alcohol Ethoxylate Surfactant | 2.52% |
| Deionized Water | 26.77% |
| 10% Ammonium Hydroxide Solution | 0.17% |
| Desired Food Coloring | 0.04% |
| Appropriate Biocide | 0.1% |

The resultant emulsion is composed of non-toxic components, and the resultant mixture of those components is also non-toxic. After the emulsion is applied to a reticulated foam filter and the water evaporates, the remainder reverts back to the viscosity where it can perform its function as a tackified coating.

It should be noted that exemplary tackified coating is odorless. It emits no functional level of fumes or odors into the air. This particular quality must be distinguished from the quality of non-toxicity, as a tackified coating may be non-toxic but still smell quite strongly. This distinction is particularly important because while non-toxicity is a requirement for respiration, the quality of being odorless is a requirement for pleasant respiration.

In exemplary form, the reticulated foam is composed of polyurethane. Once the tackified coating has been applied to the polyurethane foam filter, and the water has evaporated, the exemplary embodiment is complete.

The emulsion from Formulation 1 was prepared and applied to a reticulated foam made of polyurethane and tested for outgassing. The laboratory reported no outgassing under a range of temperatures and flow rates. As such, the exemplary form has been tested and found suitable for respiration. The exemplary form is also odorless.

As is the case with exemplary form, the tackified coating may be designed to be washable as well as biodegradable. When exposed to water and sodium carbonate (or other mild soap or base), the exemplary tackified coating of Formulation 1 will undergo a saponification reaction and rinse clean. The washout is biodegradable and may be washed down the sink unlike most other filter oils. The reticulated foam may then be recoated and reused once dry, thus significantly reducing landfill, by not requiring a new reticulated foam for each application.

Under the normal range of air filtration conditions, the exemplary coated foam filter exhibited other characteristics. The tackified coating does not dry out or evaporate. The coating does not harden or lose its tackiness as occurs with certain other oils; it remains soft and tacky. The viscosity does vary slightly with temperature but not outside of its functional range. Under air flow, the coating remains in its place and does not migrate. Finally, the tackified coating does not appreciably interfere with the flow rate.

The exemplary filter has yielded surprising and unexpected properties. A reticulated foam filter with a tackified coating was prepared according to the exemplary process. The coated foam layer was sandwiched between two layers of uncoated polyurethane foam, such that regardless of the filter's facing in the airstream, an uncoated layer of foam would make initial contact with incoming airflow. The resulting exemplary filter measured 20"×20"×1". ANSI/ASHRAE Standard 52.2-2007 and Standard 52.1 tests were run on the exemplary filter.

FIGS. 2, 3, and 4 represent the results of the ANSI/ASHRAE Standard 52.2-2007 test. FIG. 2 shows pressure drop as a function of flow rate. Normally, as flow rate increases, the pressure drop increases as well. This normal relation is shown to be a linear function in exemplary filter. FIG. 3 shows fractional efficiency of the filter as a function of particle diameter. Above a minimum threshold size, the efficiency at which the filter can stop the particulate from passing through increases as well. The threshold size for exemplary filter was 3 microns (μm) after which the efficiency of the filter increased exponentially.

FIG. 4 is a table summarizing the data represented in FIGS. 2 and 3. All of the Standard 52.2-2007 data is then condensed into a single value, the MERV rating. The MERV rating is a standardized measure allowing comparisons to be made between filters of different material, make, and manufacture. The MERV rating attempts to capture not only the use but the efficiency of filters. FIG. 5 is a table published by the EPA that was consolidated from the ANSI/ASHRAE 52.2-2007 table which explains the MERV ratings.

The MERV rating of the exemplary coated reticulated foam filter of 1" thickness was 9. That rating puts the exemplary 1" filter on par with extended surface pleated fiber filters 1-6" thick and box filter rigid style cartridges 6-12" thick. The 9 MERV rating means that exemplary filter is capable of filtering legionella (the bacteria that causes Legionnaires disease and that is associated with air conditioning cooling towers), lead dust, auto emission particles, among other particulate matter.

According to the data from FIG. 5, foam filters typically receive MERV ratings in the 1-4 range and are only capable of stopping particles of 10 μm and larger. This means that exemplary filter may filter an array of particulate matter not captured by a standard reticulated foam filter, e.g., mold, spores, cat and dog dander, hairspray, or any number of things between 3 μm and 10 μm not arrested by the standard foam filters.

Typically, high efficiency comes at the expense of an increased pressure drop. This phenomena occurs because the normal approach to achieve higher efficiency (the ability to capture smaller particles) requires airways be made smaller. While this approach does achieve higher efficiency, it results in increased resistance to flow as more and more of the surface area exposed to air flow is taken up by airway walls. Instant invention does not suffer the same degree of pressure drop. Despite its greatly increased efficiency relative to uncoated reticulated foams, exemplary filter has displayed a low pressure drop and defies the common issue of increased pressure drop with increased efficiency.

Because of this unique property, significant energy savings can be realized, benefiting the environment. Because exemplary filter is able to filter much smaller particulate matter than other comparable air filters, less dust is able to pass through to settle on heating and cooling elements, better preserving their efficiency. At the same time, the HVAC systems do not have to work much harder to move air because there is not a significant pressure drop associated with this increased efficiency.

Figure 6:
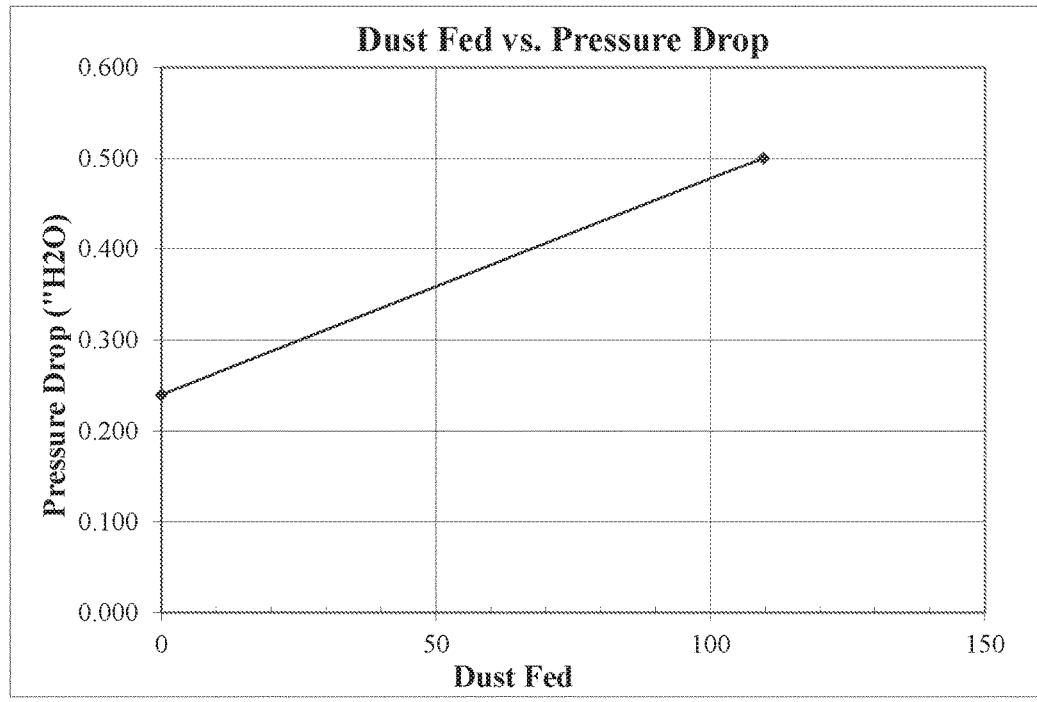
FIG. 6 is a graph illustrating the first set of the results of the ANSI/ASHRA 52.1 Dust Spot Efficiency Test.
Figure 7:
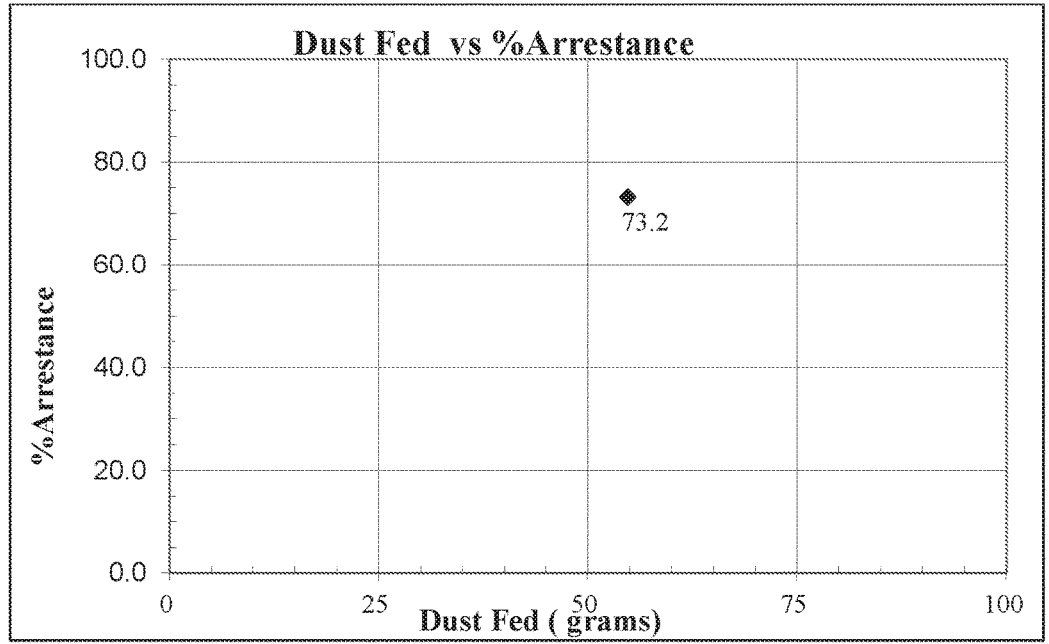
FIG. 7 is graph illustrating the second set of results from the ANSI/ASHRA 52.1 Dust Spot Efficiency Test.

FIGS. 6-7 capture the ANSI/ASHRAE 52.1 standard dust spot efficiency test. The dust spot efficiency test shows how much dust a filter can hold until reaching a resistance of ½" of water. The resistance of ½" of water is signifies when a filter has reached the designated failure threshold and where, in the real world, that filter would need to be replaced.

FIG. 6 illustrates pressure drop as a function of dust fed. As dust is fed to the filter, the filter becomes increasingly saturated. As the filter becomes increasingly saturated, less of airways are available for the passage of air; this causes a corresponding restriction of airflow. A restriction of airflow may be stated as an increase in pressure drop. So, restating the relationship, as dust is fed into the filter, the pressure drop gradually rises to the failure threshold Exemplary filter was fed 109.6 grams of dust before reaching the failure threshold. To put that in perspective, a 1" pleated fiber filter will reach failure after being fed only 14 grams of dust. Exemplary filter can be fed almost eight times more dust than a 1" pleated fiber filter before reaching the failure threshold.

FIG. 7 shows the percent arrestance, the amount of the dust fed that the filter retains. In this portion of the test, 54.8 grams of dust were fed into the exemplary filter, and the filter was able to successfully capture 73.2% of that test load. Put another way, of the 109 grams fed to the exemplary filter in the failure threshold test, it retained 80 grams of that dust.

This increased dust holding translates into energy and cost savings. Under normal conditions, the recommended replacement time of exemplary filter is one year. Other air filters on the market are recommended to be replaced as often as once a month. The time, energy, and costs associated with having to replace a filter at one twelfth the rate of a standard filter illustrate a significant savings and benefit to the environment provided by exemplary filter.

Figure 8:
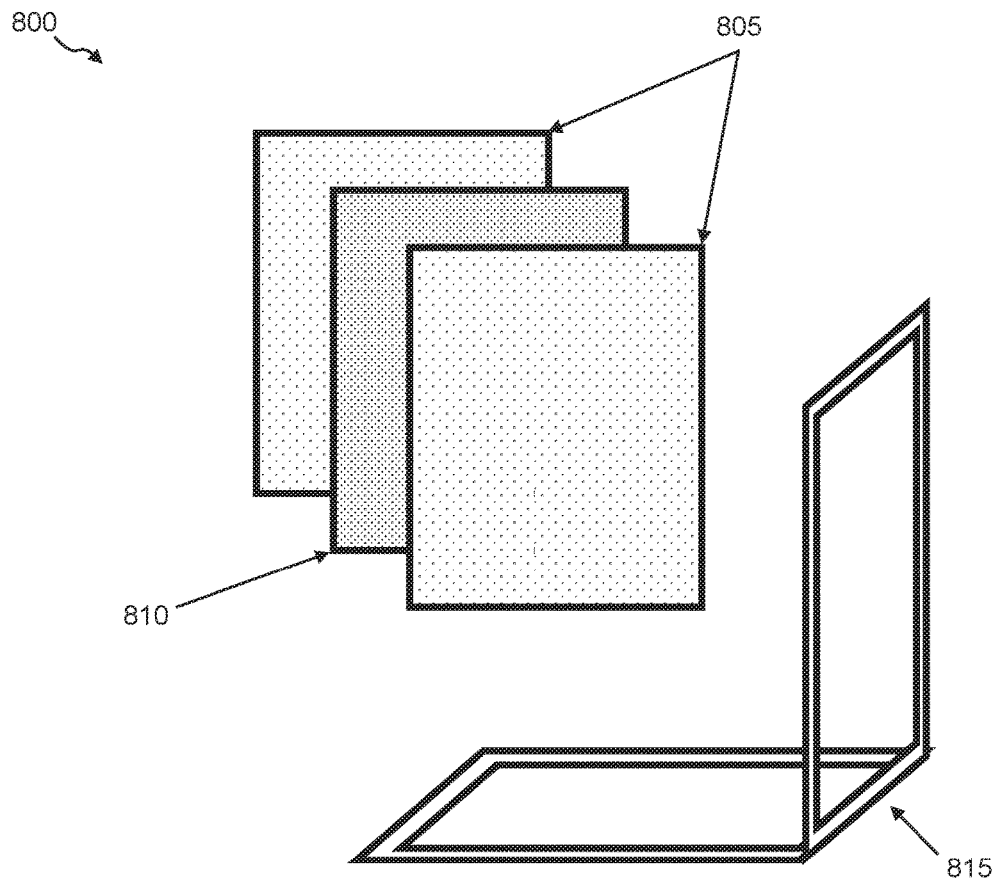
FIG. 8 shows exemplary components of an air filter.

Referring to FIG. 8, the components of exemplary air filter 800 are depicted. These components can include dry foam layers (pre-filters) 805, wet (coated) foam layers 810, and a housing 815 to hold the foam layers and to enable mounting of the air filter 800 into, for example, a duct. Additional layers of coated and/or non-coated foam can be used in the air filter 800. These layers can be used to adjust various parameters of the air filter 800, such as the amount of air flow it permits, its holding capacity, its % arrestance, etc. Preferably, the outside layers are made of dry foam so that the user does not have to touch a wet surface when they are installing the air filter 800.

Various parameters of the materials of the air filter 800 can be adjusted to achieve a desired result. For example, the porosity of the layers can be changed, along with the thickness and the number of layers, to match airflow requirements, or to create more particle holding capacity, etc.

Figure 9:
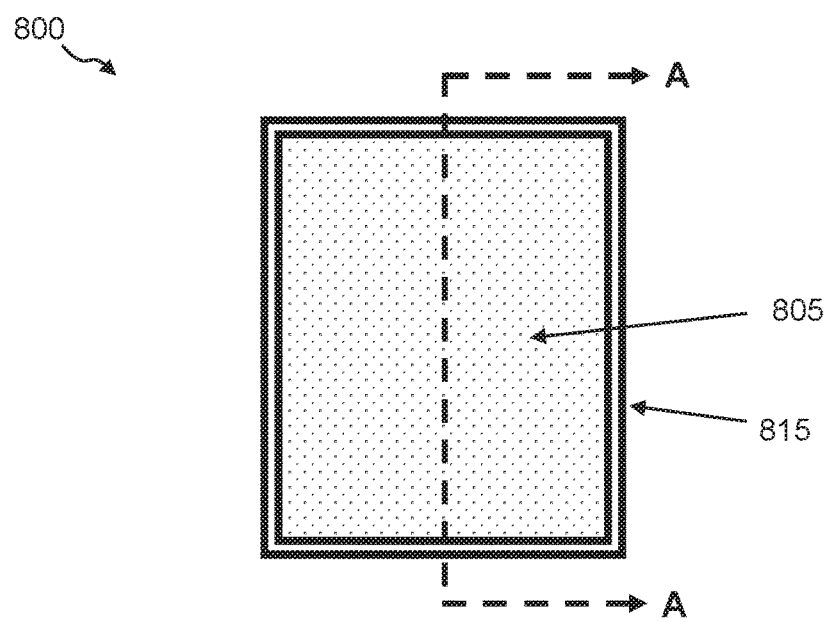
FIG. 9 is a front view of the air filter when it is assembled.

Referring to FIG. 9, a front view of the air filter 800 is shown. The dry foam layer 805 can be positioned on the outside of the air filter so that the user does not come in contact with the wet foam layer 810 when they are installing the air filter 800. The air filter 800 can be of an appropriate shape and size to fit into any opening where air filters are normally placed. For example, sizes can be different in different parts of a house, and can be different in a commercial setting as opposed to a residential setting.

Figure 10:
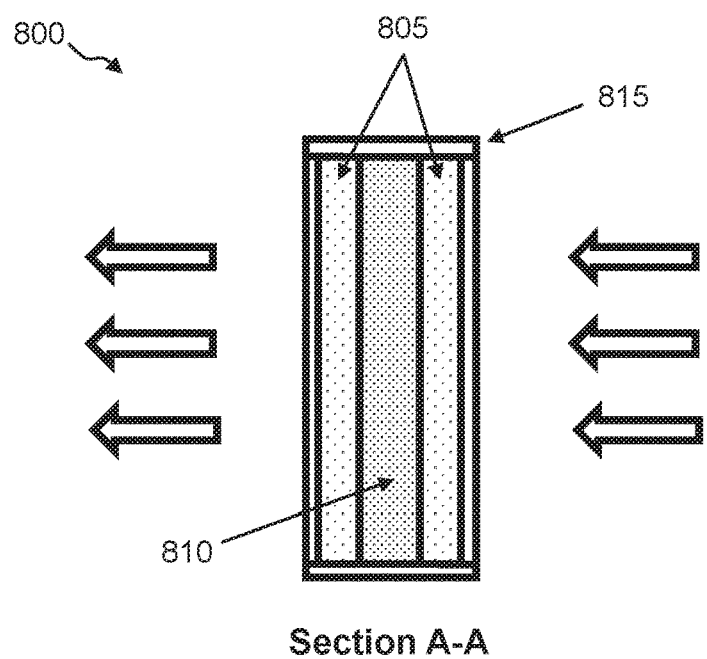
FIG. 10 is a cross-section of the assembled air filter.

Referring to FIG. 10, a cross-section view of the air filter 800 is shown. The dry foam layers 805 are depicted on the outside and the wet foam layer 810 is depicted on the inside. The air flow will travel from one side of the air filter 800 to the other, passing through all the layers of the air filter 800. In a preferred embodiment, the dry foam layers 805 have a higher porosity than the inner wet foam layer 810. The dry foam layers 805 serve to stop bigger particles from traveling through and blocking the smaller cells of the inner wet foam layer 810. The inner wet foam layer 810 then blocks the smaller particles from travelling through the air filter 800. The inner wet foam layer 810 can have a specific thickness to it. Larger thicknesses result in a larger particle holding capacity because the entire volume of the inner wet foam layer 810 can be used to arrest particles as the particles move from the surface of the inner wet foam layer 810 into the inner volume of the inner wet foam layer 810. This is in contrast to traditional air filters which only arrest particles on the surface of the filter. The thickness (and porosity) of the inner wet foam layer 810 and the outer dry foam layers 805 can also be adjusted to achieve a desired air flow.

The problems faced in the creation of this invention, as well as the combination of multiple requirements, e.g. lower viscosity for application, higher viscosity once on the foam, tackiness in being able to stick and retain dust particles, non-toxicity, and optionally, odorlessness, biodegradability, and washability, make for an infinite number of combinations with no easily traversed subset of identified predictable solutions. Additionally, this novel approach resulted in unforeseen and surprising upgraded performance characteristics.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims and their equivalents be covered thereby.

What is claimed is:

1. A coated, reticulated foam air filter for filtering air suitable for respiration, the air filter comprising:
    a housing comprising a frame structure, the frame structure configured for holding a filter material in place, the frame structure configured for enabling an air flow stream for respiration to pass through the housing and the filter material, the filter material comprising:
        an inner foam layer arranged within the housing, wherein the inner foam layer is coated with a non-toxic tackified coating comprising a C-36 dicarboxylic acid and a rosin acid distilled tall oil; and
        at least one outer foam layer arranged within the housing, the first outer foam layer positioned next to the inner foam layer so as to make initial contact with the air flow stream.

2. The coated, reticulated foam air filter of claim 1, wherein the C-36 dicarboxylic acid and rosin acid distilled tall oil are present in a weight ratio of between about 3 to about 3.5.

3. The coated, reticulated foam air filter of claim 1, wherein the inner foam is coated with the tackified layer by application of an oil composition in a form of an emulsion having an acidic pH.

4. The coated, reticulated foam air filter of claim 3, wherein the oil composition comprises at least about 50% of a C-36 dicarboxylic acid and between about 14% to about 16% of the rosin acid distilled tall oil by weight of the oil composition.

5. The coated, reticulated foam air filter of claim 3, wherein the emulsion comprises a continuous phase that is present in a smaller proportion relative to a dispersed phase.

6. The coated, reticulated foam air filter of claim 3, wherein the dispersed phase comprises between about 68% to about 71% by weight of the oil composition.

7. The coated, reticulated foam air filter of claim 3, wherein the oil composition further comprises an acetic acid solution, an alcohol ethoxylate surfactant, an ammonium hydroxide solution, and water.

8. The filter composition of claim 3, wherein the oil composition's pH is between about 5 to about 6.

9. A coated, reticulated foam air filter for filtering air suitable for respiration, the air filter comprising:
    a housing comprising a frame structure, the frame structure configured for holding a filter material in place, the filter material comprising:
        an inner foam layer arranged within the housing, wherein the inner foam layer is coated with a tackified coating comprising a C-36 dicarboxylic acid and a rosin acid distilled tall oil;
        at least one outer foam layer arranged within the housing, the first outer foam layer positioned next to the inner foam layer so as to make initial contact with an air flow stream intended for human respiration; and
        wherein the tackified coating is washable, non-toxic and odorless.

10. The coated, reticulated foam air filter of claim 9, wherein the tackified coating emits no functional level of fumes into the air.

11. The coated, reticulated foam air filter of claim 9, wherein the tackified coating remains soft and tacky under use.

12. The coated, reticulated foam air filter of claim 9, wherein the air filter receives a MERV rating greater than or equal to 9.

13. The coated, reticulated foam air filter of claim 11, wherein the air filter receives a MERV rating greater than or equal to 9.

* * * * *